(12) United States Patent
Nishimura

(10) Patent No.: US 12,401,892 B2
(45) Date of Patent: Aug. 26, 2025

(54) ELECTRONIC APPARATUS CAPABLE OF DETECTING A LINE OF SIGHT

(71) Applicant: CANON KABUSHIKI KAISHA, Tokyo (JP)

(72) Inventor: Tomonori Nishimura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 294 days.

(21) Appl. No.: 18/298,483

(22) Filed: Apr. 11, 2023

(65) Prior Publication Data

US 2023/0345114 A1  Oct. 26, 2023

(30) Foreign Application Priority Data

Apr. 21, 2022  (JP) .................. 2022-070192

(51) Int. Cl.
*H04N 23/63* (2023.01)
*H04N 23/611* (2023.01)

(52) U.S. Cl.
CPC ......... *H04N 23/635* (2023.01); *H04N 23/611* (2023.01); *H04N 23/631* (2023.01)

(58) Field of Classification Search
CPC .. H04N 23/635; H04N 23/611; H04N 23/631; H04N 23/745; H04N 23/675; H04N 23/633; H04N 23/634; H04N 23/63; H04N 23/61; H04N 23/60; G06F 3/013; G06F 3/0482; G06F 3/012; G06F 3/038; G02B 7/287; G02B 27/0093
See application file for complete search history.

(56) References Cited

U.S. PATENT DOCUMENTS

| | | | | |
|---|---|---|---|---|
| 9,892,689 | B2* | 2/2018 | Kang | G09G 3/3406 |
| 11,023,038 | B2* | 6/2021 | Yasuda | G06F 3/038 |
| 11,960,647 | B2* | 4/2024 | Niioka | G06F 3/14 |
| 12,086,310 | B2* | 9/2024 | Tamaki | G06F 3/013 |
| 2011/0170066 | A1* | 7/2011 | Sugio | A61B 5/6803 348/78 |
| 2016/0224109 | A1* | 8/2016 | Lee | G06F 3/005 |
| 2020/0382693 | A1* | 12/2020 | Fujiwara | H04N 23/633 |

FOREIGN PATENT DOCUMENTS

JP         05-56313 A      3/1993

* cited by examiner

*Primary Examiner* — Abdelaaziz Tissire
(74) *Attorney, Agent, or Firm* — Cowan, Liebowitz & Latman, P.C.

(57) ABSTRACT

An electronic apparatus according to the present invention includes at least one memory and at least one processor which function as: a detection unit configured to detect a line-of-sight position of a user within a display region; and a display control unit configured to control such that a first indicator is displayed on a basis of the line-of-sight position detected by the detection unit and an item is displayed at a position that does not overlap a range indicated by the first indicator when a predetermined condition is satisfied and is within a predetermined range from the range in response to the predetermined condition being satisfied.

17 Claims, 10 Drawing Sheets

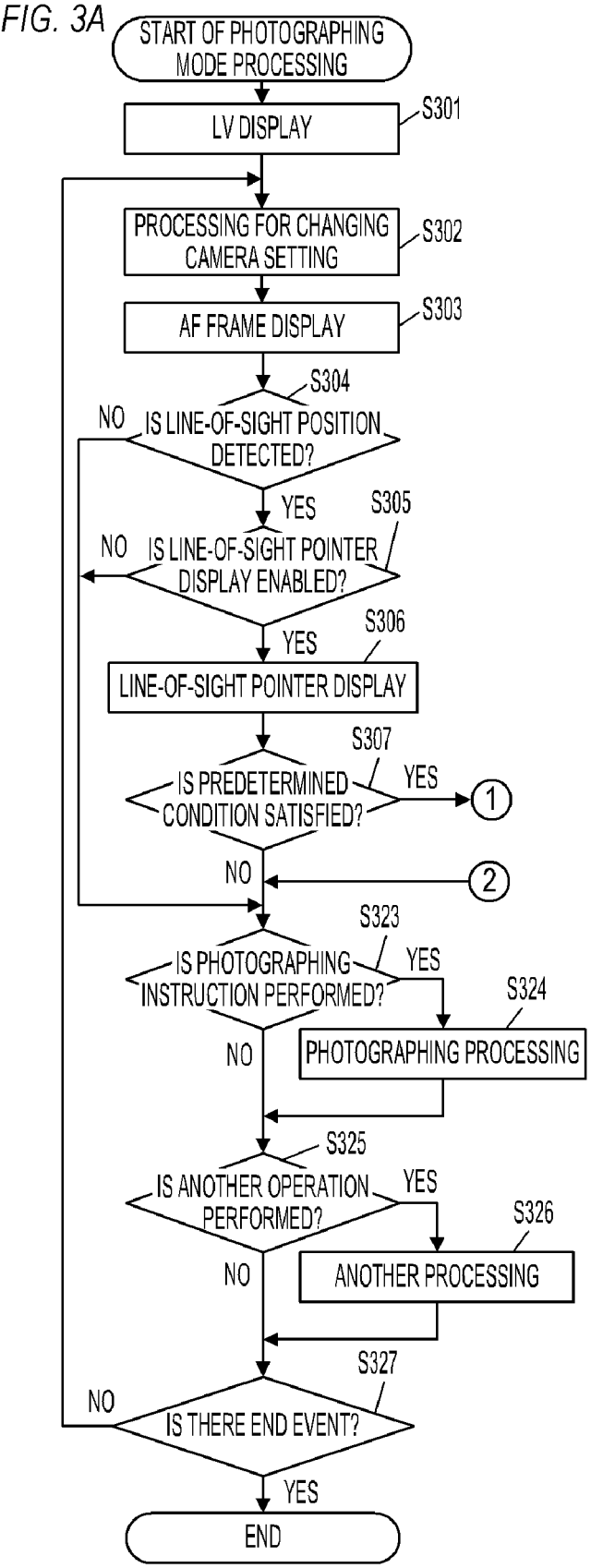

ELECTRONIC APPARATUS CAPABLE OF DETECTING A LINE OF SIGHT

BACKGROUND OF THE INVENTION

Field of the Invention

The present invention relates to an electronic apparatus, and more particularly to an electronic apparatus capable of detecting a line of sight.

Description of the Related Art

In an electronic viewfinder of a digital camera, an item (information or a warning) for assisting photographing is displayed together with a live view image. Such an item is often disposed on the periphery of a screen in order not to disturb checking of the live view image.

When a line of sight is moved to the periphery of the screen to check an item, a photo opportunity may be missed, and thus a method for enabling an item to be checked with a small amount of movement of the line of sight has been proposed. For example, Japanese Patent Application Laid-open No. H05-56313 discloses a technique for displaying an item at the line-of-sight position of a user.

However, in the technique disclosed in Japanese Patent Application Laid-open No. H05-56313, since the item is displayed at the line-of-sight position, the item disturbs checking of the live view image (an object at the line-of-sight position), and thus the user may miss a shutter chance.

SUMMARY OF THE INVENTION

The present invention provides a technique capable of displaying an item such that a user can check the item without being disturbed and with a small amount of movement of a line of sight.

An electronic apparatus according to the present invention includes at least one memory and at least one processor which function as: a detection unit configured to detect a line-of-sight position of a user within a display region; and a display control unit configured to control such that a first indicator is displayed on a basis of the line-of-sight position detected by the detection unit and an item is displayed at a position that does not overlap a range indicated by the first indicator when a predetermined condition is satisfied and is within a predetermined range from the range in response to the predetermined condition being satisfied.

Further features of the present invention will become apparent from the following description of exemplary embodiments with reference to the attached drawings.

BRIEF DESCRIPTION OF THE DRAWINGS

FIGS. 3A and 3B are flowcharts of photographing mode processing.

DESCRIPTION OF THE EMBODIMENTS

External View of Digital Camera 100

Figure 1A:
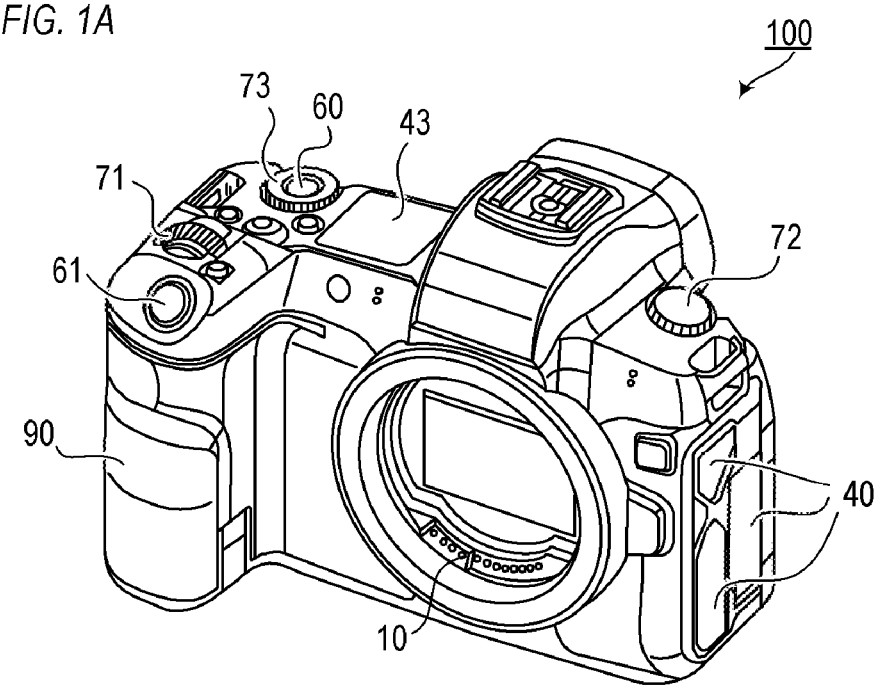
FIGS. 1A and 1B are external views of a digital camera.
Figure 1B:
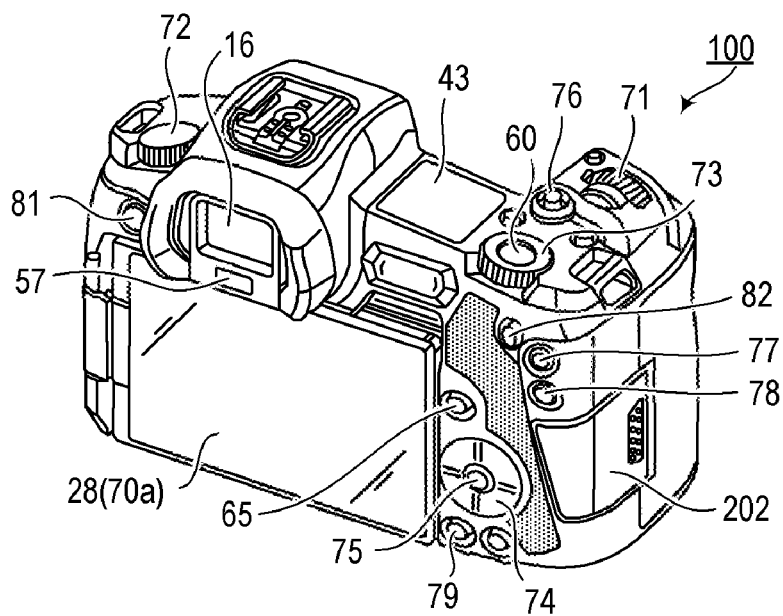

Hereinafter, embodiments of the present invention will be described with reference to the drawings. FIGS. 1A and 1B are external views of a digital camera 100 as an example of an electronic apparatus to which the present invention can be applied. FIG. 1A is a front perspective view of the digital camera 100, and FIG. 1B is a rear perspective view of the digital camera 100.

A display unit 28 is a display unit provided on the rear surface of the digital camera 100 and displays an image and various types of information. A touch panel 70a can detect a touch operation on a display surface (a touch operation surface; a touch operation member) of the display unit 28. A non-finder display unit 43 is a display unit provided on the upper surface of the digital camera 100 and displays various setting values of the digital camera 100 such as a shutter speed and an opening degree of an aperture. A shutter button 61 is an operation member for giving a photographing instruction (an imaging instruction). A mode changeover switch 60 is an operation member for switching between various modes. A terminal cover 40 is a cover that protects a connector (not shown) that connects the digital camera 100 to an external apparatus.

A main electronic dial 71 is a rotary operation member, and by rotating the main electronic dial 71, the setting values such as a shutter speed and an opening degree of an aperture can be changed. A power switch 72 is an operation member for switching between ON and OFF of the power of the digital camera 100. A sub-electronic dial 73 is a rotary operation member, and by rotating the sub-electronic dial 73, a selection frame (a cursor) can be moved and the image can be transferred. A 4-direction key 74 is configured such that up, down, left, and right portions can be pushed, and processing can be performed according to the pushed portion of the 4-direction key 74. A SET button 75 is a push button and is mainly used for determining a selection item. A multi-controller (hereinafter referred to as MC) 65 can receive direction instructions in eight directions and a push operation in the central portion.

A moving image button 76 is used to instruct start and stop of moving image photographing (recording). An AE lock button 77 is a push button, and an exposure state can be fixed by pressing the AE lock button 77 in a photographing standby state. An enlargement button 78 is an operation button for switching between ON and OFF of an enlargement mode in live view display (LV display) of a photographing mode. By operating the main electronic dial 71 after turning on the enlargement mode, a live view image (an LV image) can be enlarged or reduced. In a reproduction mode, the enlargement button 78 functions as an operation button for enlarging a reproduced image or increasing an enlargement ratio. A reproduction button 79 is an operation button for switching between the photographing mode and the reproduction mode. By pressing the reproduction button 79 during the photographing mode, the mode transitions to the reproduction mode, and the latest image among images recorded in a recording medium 200 (which will be described later) can be displayed on the display unit 28. A menu button 81 is a push button used to perform an instruction operation for displaying a menu screen. When the menu button 81 is pushed, a menu screen on which various settings can be made is displayed on the display unit 28. A user can intuitively perform various settings using the menu screen displayed on the display unit 28 and the 4-direction key 74, the SET button 75, or the MC 65. A line-of-sight confirmation button 82 is an operation member included in an operation unit 70 and is a push button for instructing execution or cancelation of selection of an object based on a position of a line-of-sight pointer, which will be described later. The line-of-sight confirmation button 82 is disposed at a position where it can be easily operated even in a state where the user is looking through a finder (a state where the eye of the user is in proximity to an eyepiece part 16) and is disposed at a position where it can be operated with the thumb of the right hand holding a grip portion 90.

A communication terminal 10 is a communication terminal for the digital camera 100 to communicate with a lens unit 150 (which will be described later; detachable). The eyepiece part 16 is an eyepiece part of an eyepiece finder (a looking-in type finder), and the user can visually recognize a video displayed on an internal EVF 29 (which will be described later; an electronic viewfinder) through the eyepiece part 16. An eye proximity detection unit 57 is an eyepiece detection sensor that detects whether or not the eye of the user (a photographer) is in proximity to the eyepiece part 16. A lid 202 is a lid for a slot in which a recording medium 200 (which will be described later) is stored. The grip portion 90 is a holding portion shaped such that the user can easily hold it with his or her right hand when holding the digital camera 100. The shutter button 61 and the main electronic dial 71 are disposed at positions where they can be operated with the index finger of the right hand in a state where the digital camera 100 is held by gripping the grip portion 90 with the little finger, the ring finger, and the middle finger of the right hand. Further, in the same state, the sub-electronic dial 73 and the line-of-sight confirmation button 82 are disposed at positions where they can be operated with the thumb of the right hand.

Configuration Block Diagram of Digital Camera 100

Figure 2:
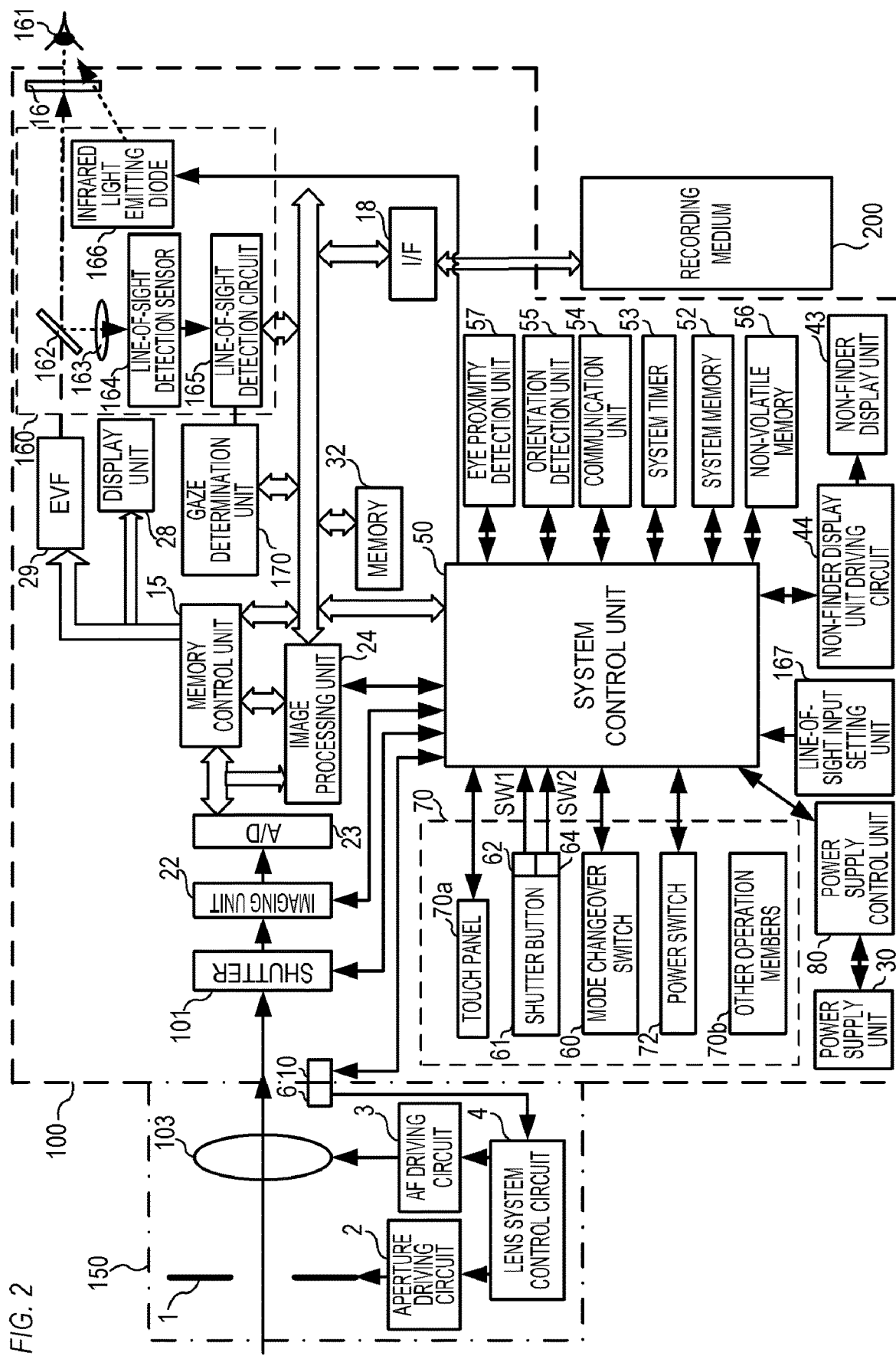
FIG. 2 is a block diagram of the digital camera.

FIG. 2 is a block diagram showing a configuration example of the digital camera 100. A lens unit 150 is a lens unit in which an interchangeable photographing lens is installed. Although a lens 103 is normally constituted by a plurality of lenses, only one lens is shown in FIG. 2 for the sake of simplicity. A communication terminal 6 is a communication terminal for the lens unit 150 to communicate with the digital camera 100, and the communication terminal 10 is a communication terminal for the digital camera 100 to communicate with a lens unit 150. The lens unit 150 communicates with a system control unit 50 via these communication terminals 6 and 10. Then, the lens unit 150 controls an aperture 1 via an aperture driving circuit 2 by a lens system control circuit 4 inside. Further, the lens unit 150 focuses by displacing the lens 103 via an AF driving circuit 3 by the lens system control circuit 4.

A shutter 101 is a focal plane shutter that can freely control the exposure time of an imaging unit 22 under the control of the system control unit 50.

The imaging unit 22 is an imaging element configured by a CCD, a CMOS device, or the like that converts an optical image into an electrical signal. The imaging unit 22 may have an imaging surface phase difference sensor that outputs defocus amount information to the system control unit 50.

An image processing unit 24 performs predetermined processing (pixel interpolation, resize processing such as reduction, color conversion processing, or the like) on data from an A/D converter 23 or data from a memory control unit 15. Further, the image processing unit 24 performs predetermined arithmetic processing using captured image data, and the system control unit 50 performs exposure control and distance measurement control on the basis of the arithmetic results obtained by the image processing unit 24. As a result, autofocus (AF) processing of a through-the-lens (TTL) type, automatic exposure (AE) processing, flash-free light emission (EF) processing, and the like are performed. The image processing unit 24 further performs predetermined arithmetic processing using the captured image data and performs auto white balance (AWB) processing of the TTL type on the basis of the obtained arithmetic results.

The memory control unit 15 controls transmission and reception of data among the A/D converter 23, the image processing unit 24, and a memory 32. Output data from the A/D converter 23 is written in the memory 32 via the image processing unit 24 and the memory control unit 15. Alternatively, the output data from the A/D converter 23 is written in the memory 32 via the memory control unit 15 without passing through the image processing unit 24. The memory 32 stores image data obtained by the imaging unit 22 and converted into digital data by the A/D converter 23 and image data to be displayed on the display unit 28 and the EVF 29. The memory 32 has a storage capacity sufficient to store a predetermined number of still images, a moving image and an audio for a predetermined period of time.

The memory 32 also serves as an image display memory (a video memory). The display image data written in the memory 32 is displayed by the display unit 28 or the EVF 29 via the memory control unit 15. Each of the display unit 28 and the EVF 29 performs display according to a signal from the memory control unit 15 on a display device such as an LCD or organic EL. The data A/D-converted by the A/D converter 23 and stored in the memory 32 is sequentially transferred to the display unit 28 or the EVF 29 for display, and thus live view display (LV) is performed. An image displayed in the live view display is hereinafter referred to as a live view image (an LV image). In a case where the live view display is performed on the display unit 28 or the EVF 29, the user can visually recognize an imaging range of the digital camera 100 via a display region of the display unit 28 or the EVF 29.

A line-of-sight detection unit 160 (a receiving unit) detects the line of sight of the eye of the user, which is in proximity to the eyepiece part 16, looking at the EVF 29. The line-of-sight detection unit 160 is constituted by a dichroic mirror 162, an image forming lens 163, a line-of-sight detection sensor 164, a line-of-sight detection circuit 165, and an infrared light emitting diode 166.

The infrared light emitting diode 166 is a light emitting element for detecting the line-of-sight position of the user within a finder screen (within the display region of the EVF 29) and irradiates an eyeball (an eye) 161 of the user with infrared light. The infrared light emitted from the infrared light emitting diode 166 is reflected by the eyeball (the eye) 161, and the reflected infrared light reaches the dichroic mirror 162. The dichroic mirror 162 reflects only the infrared light and transmits visible light. The reflected infrared light whose optical path has been changed forms an image on an imaging surface of the line-of-sight detection sensor 164 via the image forming lens 163. The image forming lens 163 is an optical member that constitutes a line-of-sight detection optical system. The line-of-sight detection sensor 164 is constituted by an imaging device such as a CCD type image sensor.

The line-of-sight detection sensor 164 photoelectrically converts the incident reflected infrared light into an electric signal and outputs the electric signal to the line-of-sight detection circuit 165. The line-of-sight detection circuit 165 detects the line-of-sight position of the user from the movement of the eyeball (the eye) 161 of the user on the basis of the output signal from the line-of-sight detection sensor 164 and outputs the detection information to the system control unit 50 and a gaze determination unit 170.

The gaze determination unit 170 determines that in a case where a period during which the line of sight of the user is fixed on a certain region exceeds a predetermined threshold value, the user is gazing at that region on the basis of the detection information received from the line-of-sight detection circuit 165. Therefore, it can be said that the region is a gaze position (a gaze region), which is a position to where gazing is performed. "The line of sight is fixed in a certain region" means, for example, that an average position of the movement of the line of sight is within the region and a variation (a dispersion) is less than a predetermined value until a predetermined period elapses. The predetermined threshold value can be arbitrarily changed by the system control unit 50. Further, the gaze determination unit 170 may not be provided as an independent block, and the system control unit 50 may execute the same function as the gaze determination unit 170 on the basis of the detection information received from the line-of-sight detection circuit 165.

In the present embodiment, the line-of-sight detection unit 160 detects the line of sight using a method called a corneal reflection method. The corneal reflection method is a method of detecting an orientation and a position of the line of sight from a positional relationship between the reflected light obtained by reflecting the infrared light emitted from the infrared light emitting diode 166 by the eyeball (the eye) 161 (especially the cornea) and the pupil of the eyeball (the eye) 161. The method of detecting the line of sight (the direction and position of the line of sight) is not particularly limited, and methods other than the above may be used. For example, a method called a sclera reflection method, which utilizes a difference in light reflectance between the iris and the white of the eye, may be used.

The various setting values of the camera, such as a shutter speed and an opening degree of an aperture, are displayed on the non-finder display unit 43 via a non-finder display unit driving circuit 44.

A non-volatile memory 56 is an electrically erasable/recordable memory such as a Flash-ROM. A constant, a program, and the like for operating the system control unit 50 are recorded in the non-volatile memory 56. The program mentioned here is a program for executing various flowcharts which will be described later in the present embodiment.

The system control unit 50 is a control unit constituted by at least one processor or circuit and controls the entire digital camera 100. The system control unit 50 executes the program recorded in the non-volatile memory 56 described above, and thus each processing of the present embodiment which will be described later is realized. A system memory 52 is, for example, a RAM, and the system control unit 50 develops a constant and a variable for operating the system control unit 50, the program read from the non-volatile memory 56, and the like into the system memory 52. Further, the system control unit 50 also performs display control by controlling the memory 32, the display unit 28, and the like.

A system timer 53 is a timer that measures the time used for various controls and the time of a built-in clock.

A power supply control unit 80 is constituted by a battery detection circuit, a DC-DC converter, a switch circuit for switching blocks to be energized, and the like and detects whether or not a battery is installed, the type of a battery, and a remaining amount of a battery. Further, the power supply control unit 80 controls the DC-DC converter on the basis of the detection results and instructions from the system control unit 50 and supplies a necessary voltage to each unit including a recording medium 200 for a necessary period. A power supply unit 30 is constituted by a primary battery such as an alkaline battery or a lithium battery, a secondary battery such as a NiCd battery, a NiMH battery, or a Li battery, an AC adapter, and the like.

A recording medium I/F 18 is an interface with the recording medium 200 such as a memory card or a hard disk. The recording medium 200 is a recording medium such as a memory card for recording a photographed image and is constituted by a semiconductor memory, a magnetic disk, and the like.

A communication unit 54 transmits and receives a video signal and an audio signal to and from an external apparatus connected wirelessly or through a wired cable. The communication unit 54 can be connected to a wireless local area network (LAN) and the Internet. Further, the communication unit 54 can communicate with an external apparatus using Bluetooth (a registered trademark) or Bluetooth Low Energy. The communication unit 54 can transmit an image (including an LV image) captured by the imaging unit 22 and an image recorded in the recording medium 200 and can receive image data and other various types of information from an external apparatus.

An orientation detection unit 55 detects the orientation of the digital camera 100 with respect to a direction of gravity. It is possible to determine whether the image photographed by the imaging unit 22 is an image photographed with the digital camera 100 held horizontally or an image photographed with the digital camera 100 held vertically on the basis of the orientation detected by the orientation detection unit 55. The system control unit 50 can add orientation information corresponding to the orientation detected by the orientation detection unit 55 to an image file of the image captured by the imaging unit 22, or rotate the image for recording. An acceleration sensor, a gyro sensor, or the like can be used as the orientation detection unit 55. It is also possible to detect the movement (pan, tilt, lift, whether or not it is stationary, or the like) of the digital camera 100 using an acceleration sensor or a gyro sensor, which is the orientation detection unit 55.

The eye proximity detection unit 57 is an eye proximity detection sensor that detects the approach (eye proximity) and departure (eye separation) of the eye (an object) 161 from the eyepiece part 16 of the eyepiece finder (hereinafter simply referred to as a "finder") (approach detection). The system control unit 50 switches display (a display state)/non-display (a non-display state) of the display unit 28 and the EVF 29 according to the state detected by the eye proximity detection unit 57. More specifically, at least in the photographing standby state and in a case where the switching of the display destination is automatic switching, during non eye proximity, the display destination is set to the display unit 28 and the display is turned on, and the EVF 29 is in non-display. In addition, during eye proximity, the display destination is set to the EVF 29 and the display is turned on, and the display unit 28 is in non-display. For example, an infrared proximity sensor can be used as the eye proximity detection unit 57, and it is possible to detect the approach of any object to the eyepiece part 16 of the finder having the EVF 29 built-in. In a case where an object approaches, an infrared ray projected from a light projecting part (not shown) of the eye proximity detection unit 57 is reflected by the object and received by a light receiving part (not shown) of the infrared proximity sensor. It is also possible to determine how close the object is from the eyepiece part 16 (an eye contact distance) on the basis of the amount of the received infrared ray. In this manner, the eye proximity detection unit 57 performs eye proximity detection for detecting the proximity distance of the object to the eyepiece part 16. It is assumed that in a case where the object approaching the eyepiece part 16 within a predetermined distance is detected from a non-eye-proximity state (a non-approach state), it is detected that the eye is in proximity to the eyepiece part 16. It is assumed that in a case where the object whose approach has been detected moves away from the eye proximity state (the approach state) by a predetermined distance or more, it is detected that the eye has been separated from the eyepiece part. A threshold for detecting the eye proximity and a threshold value for detecting the eye separation may be different from each other, for example, by providing hysteresis. Further, it is assumed that after the eye proximity is detected, the eye proximity state is maintained until the eye separation is detected. It is assumed that after eye separation is detected, the eye is in a non-eye-proximity state until the eye proximity is detected. The infrared proximity sensor is only an example, and other sensors may be employed as the eye proximity detection unit 57 as long as they can detect the approach of an eye or an object that can be regarded as the eye proximity.

The system control unit 50 can detect the following line-of-sight states toward the EVF 29 by controlling the line-of-sight detection unit 160.

- A state in which the line of sight that was not directed to the EVF 29 was newly directed to the EVF 29. That is, the start of line-of-sight input.
- A state in which the line-of-sight input to the EVF 29 is being performed.
- A state in which the user is gazing at a certain position of the EVF 29.
- A state in which the line of sight directed to the EVF 29 was removed. That is, the end of line-of-sight input.
- A state in which no line of sight is input to the EVF 29 (a state in which the user does not look the EVF 29).

The system control unit 50 is notified of these operations/states and the position (the direction) where the line of sight is directed to the EVF 29 via an internal bus, and the system control unit 50 determines what kind of line-of-sight input is performed on the basis of the notified information.

The operation unit 70 is an input unit that receives an operation from a user (a user operation) and is used to input various operation instructions to the system control unit 50. As shown in FIG. 2, the operation unit 70 includes the mode changeover switch 60, the shutter button 61, the power switch 72, the touch panel 70a, and the like. The operation unit 70 also includes other operation members 70b such as the main electronic dial 71, the sub-electronic dial 73, the 4-direction key 74, the SET button 75, the moving image button 76, the AE lock button 77, the enlargement button 78, the reproduction button 79, the menu button 81, MC 65, and the like.

The mode changeover switch 60 switches the operation mode of the system control unit 50 between a still image photographing mode, a moving image photographing mode, a reproduction mode, and the like. Modes included in the still image photographing mode are an auto photographing mode, an auto scene determination mode, a manual mode, an aperture priority mode (an Av mode), a shutter speed priority mode (a Tv mode), and a program AE mode (a P mode). In addition, there are various scene modes which are photographing settings for each photographing scene, a custom mode, and the like. The mode changeover switch 60 allows the user to directly switch to any of these modes. Alternatively, after once switching to the photographing mode list screen with the mode changeover switch 60, it is possible to selectively switch to any of the displayed plural modes using another operation member. Similarly, the moving image photographing mode may also include a plurality of modes.

The shutter button 61 includes a first shutter switch 62 and a second shutter switch 64. The first shutter switch 62 is turned on when the shutter button 61 is being operated, that is, when the shutter button 61 is half-pressed (a photographing preparation instruction) and generates a first shutter switch signal SW1. The system control unit 50 starts photographing preparation operations such as autofocus (AF) processing, auto exposure (AE) processing, auto white balance (AWB) processing, and flash-free light emission (EF) processing in response to the first shutter switch signal SW1. The second shutter switch 64 is turned on when the operation of the shutter button 61 is completed, that is, when the shutter button 61 is fully pressed (photographing instruction) and generates a second shutter switch signal SW2. The system control unit 50 starts a series of photographing processing operations from signal reading from the imaging unit 22 to writing of the photographed image as an image file in the recording medium 200 in response to the second shutter switch signal SW2.

The touch panel 70a and the display unit 28 can be configured integrally with each other. For example, the touch panel 70a is configured such that the light transmittance does not interfere with the display of the display unit 28 and is attached to the upper layer of the display surface of the display unit 28. Then, the input coordinates on the touch panel 70a and the display coordinates on the display surface of the display unit 28 are associated with each other. This makes it possible to provide a graphical user interface (GUI) as if the user can directly operate the screen displayed on the display unit 28.

The system control unit 50 can detect the following operations or states on the touch panel 70a.

- A state in which the touch panel 70a is newly touched by a finger or pen that has not touched the touch panel 70a, that is, the start of touch (hereinafter referred to as touch-down).
- A state in which the touch panel 70a is touched with a finger or a pen (hereinafter referred to as touch-on).
- A state in which the finger or pen is moving while touching the touch panel 70a (hereinafter referred to as touch-move).
- A state in which the finger or pen touching the touch panel 70a is separated (released) from the touch panel 70a, that is, the end of touch (hereinafter referred to as touch-up).
- A state in which nothing is touched on the touch panel 70a (hereinafter referred to as touch-off).

When the touch-down is detected, the touch-on is also detected at the same time. After the touch-down, the touch-on normally continues to be detected unless the touch-up is detected. Even in a case where the touch-move is detected, the touch-on is detected at the same time. Even if the touch-on is detected, the touch-move is not detected if the touch position does not move. After it is detected that all the finger and pen that have touched have touched up, it is the touch-off.

The system control unit 50 is notified of these operations/states and the coordinates of the position where the finger or pen touches the touch panel 70a through the internal bus.

Then, the system control unit 50 determines what kind of operation (touch operation) is performed on the touch panel 70a on the basis of the notified information. As for the touch-move, the moving direction of the finger or pen moving on the touch panel 70a can also be determined for each vertical component/horizontal component on the touch panel 70a on the basis of the change in the position coordinates. In a case where it is detected that the touch-move has been performed for a predetermined distance or more, it is determined that a slide operation is performed. An operation of touching the touch panel 70a with the finger and quickly moving it by a certain distance and then releasing it as it is, is called a flick. The flick is, in other words, an operation of quickly tracing the touch panel 70a as if the finger flicks on the touch panel 70a. It can be determined that the flick is performed when the touch-move of a predetermined distance or more at a predetermined speed or more is detected and the touch-up is detected as it is (it can be determined that the flick occurs following the slide operation). Further, a touch operation of touching (multi-touching) a plurality of locations (for example, two points) together to bring the touch positions closer to each other is referred to as pinch-in, and a touch operation of moving the touch positions away from each other is referred to as pinch-out. The pinch-out and the pinch-in are collectively referred to as a pinch operation (or simply pinch). The touch panel 70a may be any one of various types of touch panels such as a resistive film type, a capacitive type, a surface acoustic wave type, an infrared type, an electromagnetic induction type, an image recognition type, an optical sensor type, and the like. There are a method of detecting that there is a touch when there is contact with the touch panel, and a method of detecting that there is a touch when there is an approach of the finger or pen to the touch panel, but any one method may be used.

The digital camera 100 may be provided with an audio input unit (not shown) for transmitting audio signal obtained from a built-in microphone or an audio input apparatus connected to the digital camera 100 via an audio input terminal to the system control unit 50. In this case, the system control unit 50 selects the input audio signal as necessary, performs analog-to-digital conversion, performs level optimization processing, specific frequency reduction processing, and the like, and generates an audio signal.

In the present embodiment, the user can set a method of specifying a position of a position index (for example, an AF frame) in a case where the touch-move is performed in the eye proximity state to any one of an absolute position specifying method and a relative position specifying method. The absolute position specifying method is a method in which the input coordinates on the touch panel 70a and the display coordinates on the display surface of the EVF 29 are associated with each other. In the case of the absolute position specifying method, when there is a touch-down on the touch panel 70a, the AF frame is set at a position associated with the touched position (the position whose coordinates are input) even if there is no touch-move (the position of the AF frame moves from the position before the touch-down). The position set by the absolute position specifying method is a position based on the touched-down position regardless of the position set before the touch-down. Further, if there is the touch-move after the touch-down, the position of the AF frame also moves on the basis of the touch position after the touch-move. The relative position specifying method is a method in which the input coordinates on the touch panel 70a and the display coordinates on the display surface of the EVF 29 are not associated with each other. In the case of the relative position specifying method, when there is only a touch-down on the touch panel 70a and there is no touch-move, the position of the AF frame does not move from the position before the touch-down. If there is the touch-move after that, regardless of the touch-down position, the position of the AF frame moves from the position of the currently set AF frame (the position set before the touch-down) by a distance according to the amount of movement of the touch-move in a movement direction of the touch-move.

As an AF method (an AF frame setting method), any one of a plurality of AF methods including "single-point AF" and "face+tracking priority AF" can be set. The "single-point AF" is a method in which the user specifies one location as a position for performing AF using a single-point AF frame. The "face+tracking priority AF" is a method in which the AF position is automatically set on the basis of automatic selection conditions in a case where the user does not specify a tracking target. In the automatic AF position setting, if a human face is detected from the LV image, the face is preferentially selected as an AF target object. If the pupil is detected inside the face, the pupil can be preferentially selected as the AF target object. In case where a plurality of human faces are detected, one face is selected according to priority such as the size of the face being large, the position of the face being close to the digital camera 100 (on the closest side), the position of the face being close to the center in the image, or the face being a face of a pre-registered individual, and the selected face is set as the AF target object. If the human face is not detected, an object other than the face is selected as the AF target object according to priority such as the object being close to the digital camera 100 (on the closest side), the object being high in contrast, the object being high priority object such as an animal or vehicle, or the object being a moving object, and the selected object is set as the AF target object. In a case where an object to be tracked is specified by the user, the object to be tracked is set as the AF target object. That is, the automatic selection conditions are weighted using at least one element condition among element conditions which will be shown in an example below, and the conditions are that the obtained score is equal to or greater than a predetermined threshold value or the obtained score is the highest.

It is the face of a detected human.
The size of the face is large.
The position of the face is close to the digital camera 100 (on the closest side).
The position of the face is close to the center in the image.
It is the face of a pre-registered individual.
It is close to the digital camera 100 (on the closest side).
It is high in contrast.
It is a high-priority object such as an animal or vehicle.
It is a moving object.

Photographing Mode Processing

Figure 3B:
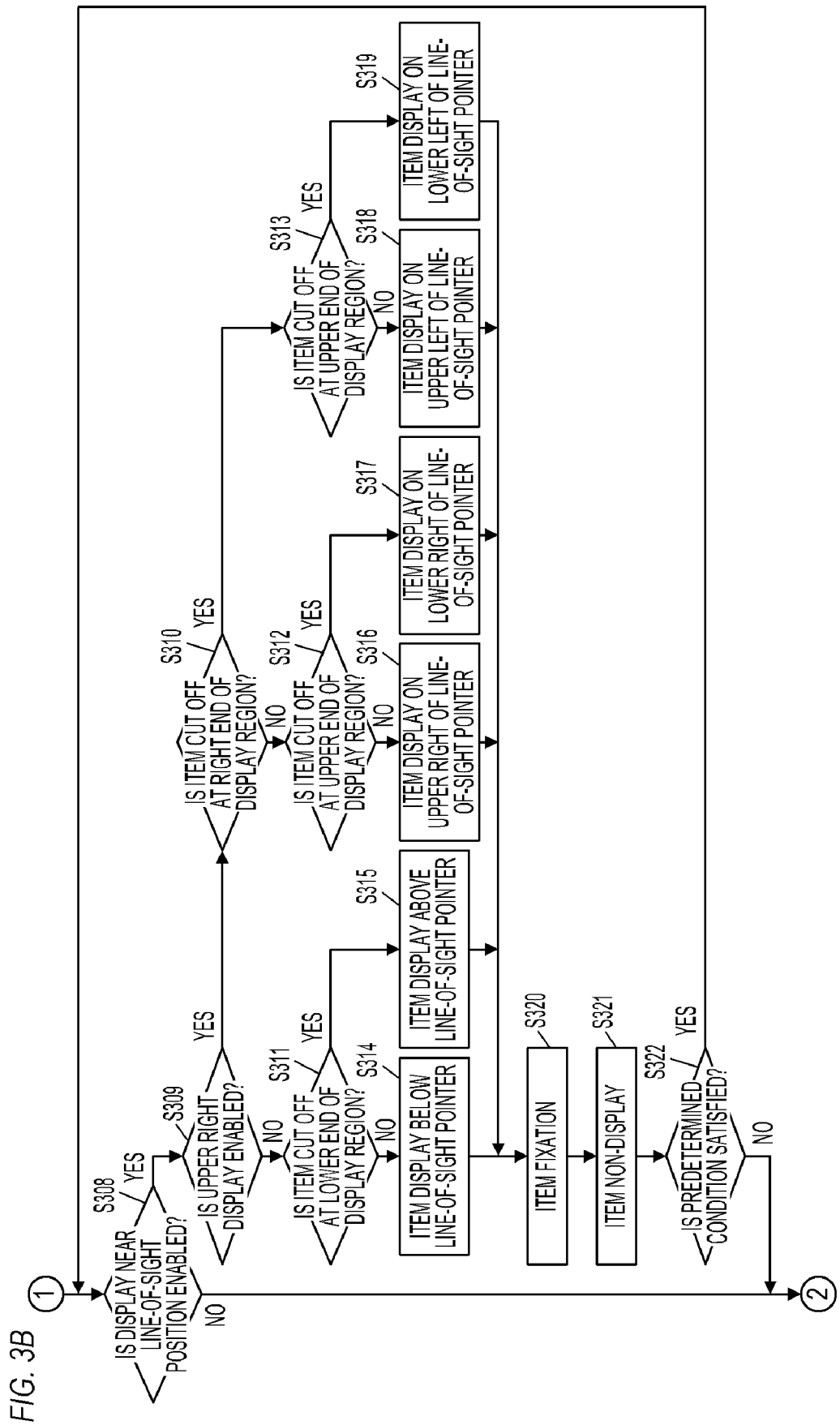

FIGS. 3A and 3B are flowcharts of photographing mode processing in the digital camera 100. This processing is realized by the system control unit 50 developing the program stored in the non-volatile memory 56 into the system memory 52 and executing the program. When the digital camera 100 is activated in the photographing mode, flags, control variables, and the like are initialized, and the processing of FIGS. 3A and 3B is started.

In S301, the system control unit 50 starts capturing the live view image (the LV image) with the imaging unit 22 and displays the captured LV image on the display unit 28 or the EVF 29. The LV image is displayed on the EVF 29 during the eye proximity (in a case where the eye proximity is detected by the eye proximity detection unit 57), and the LV image is displayed on the display unit 28 during the non eye proximity (in a case where the eye proximity is not detected by the eye proximity detection unit 57).

In S302, the system control unit 50 performs processing for changing settings related to photographing in accordance with the user's operation. The settings related to photographing include, for example, setting whether the AF target object to be prioritized is the face or the pupil, setting the shutter speed, setting whether or not to display the line-of-sight pointer, and setting whether or not to display an item (information or a warning) near the line-of-sight position.

In S303, the system control unit 50 displays the AF frame (an indicator indicating the AF target object) on the display unit 28 or the EVF 29 on the basis of the settings related to photographing. For example, the AF frame is displayed to show the face closest to the center of the LV image. The AF target object may be a pupil, a human, an animal, a vehicle, or the like.

In S304, the system control unit 50 determines whether or not the line of sight (the line-of-sight position) is detected by the line-of-sight detection circuit 165. In a case where the line of sight is detected, the process proceeds to S305, and otherwise, the process proceeds to S323. This determination is repeated during the processing of S305 to S322, and when the line-of-sight detection circuit 165 no longer detects the line of sight, the process proceeds from S305 to S322 to S323.

In S305, the system control unit 50 determines whether or not the line-of-sight pointer display (setting to display the line-of-sight pointer) is enabled. In a case where the line-of-sight pointer display is enabled, the process proceeds to S306, and otherwise, the process proceeds to S323. The line-of-sight pointer is an indicator that indicates the line-of-sight position of the user and is, for example, a translucent indicator made up of a point and a circle surrounding the point. A portion of the line-of-sight pointer (for example, only the point) may be translucent, or the entirety thereof may be opaque.

In S306, the system control unit 50 displays the line-of-sight pointer on the EVF 29 on the basis of the line-of-sight position detected by the line-of-sight detection circuit 165.

In S307, the system control unit 50 determines whether or not a predetermined condition such as the occurrence of an error and the change of a setting value is satisfied in the digital camera 100. In a case where the predetermined condition is satisfied, the process proceeds to S308, and otherwise, the process proceeds to S323. For example, in a case where flicker is detected in the LV image, or in a case where the shutter speed (a Tv value) is changed according to the operation of the main electronic dial 71, the process proceeds to S308.

In S308, the system control unit 50 determines whether or not display near the line-of-sight position (setting for displaying the item (the warning or the information) indicating an error or a setting value near the line-of-sight position) is enabled. In a case where the display near the line-of-sight position is enabled, the process proceeds to S309, and otherwise, the process proceeds to S323.

In S309, the system control unit 50 determines whether or not upper right display (setting for displaying the item (the warning or the information) indicating an error or a setting value on the upper right of the line-of-sight position) is enabled. In a case where the upper right display is enabled, the process proceeds to S310, and otherwise, the process proceeds to S311.

In S310, the system control unit 50 determines whether or not the item is cut off at the right end of the display region of the EVF 29 when the item is displayed on the upper right of the line-of-sight position on the basis of the line-of-sight position detected by the line-of-sight detection circuit 165. For example, the system control unit 50 determines whether or not the display position of the item (for example, the center position of the item) is on the right side from the display region. In a case where the item is cut off at the right end of the display region, the process proceeds to S313, and otherwise, the process proceeds to S312.

In S311, the system control unit 50 determines whether or not the item is cut off at the lower end of the display region of the EVF 29 when the item is displayed below (directly below) the line-of-sight position on the basis of the line-of-sight position detected by the line-of-sight detection circuit 165. For example, the system control unit 50 determines whether or not the display position of the item is below the display region. In a case where the item is cut off at the lower end of the display region, the process proceeds to S315, and otherwise, the process proceeds to S314.

In S312, the system control unit 50 determines whether or not the item is cut off at the upper end of the display region of the EVF 29 when the item is displayed on the upper right of the line-of-sight position on the basis of the line-of-sight position detected by the line-of-sight detection circuit 165. For example, the system control unit 50 determines whether or not the display position of the item is above the display region. In a case where the item is cut off at the upper end of the display region, the process proceeds to S317, and otherwise, the process proceeds to S316.

In S313, the system control unit 50 determines whether or not the item is cut off at the upper end of the display region of the EVF 29 when the item is displayed on the upper left of the line-of-sight position on the basis of the line-of-sight position detected by the line-of-sight detection circuit 165. For example, the system control unit 50 determines whether or not the display position of the item is above the display region. In a case where the item is cut off at the upper end of the display region, the process proceeds to S319, and in a case where the item is not cut off at the upper end of the display region, the process proceeds to S318.

In S314 to S319, the system control unit 50 displays the item indicating an error, a setting value, or the like at a position based on the determination results of S309 to S313 in the display region of the EVF 29. When the predetermined condition in S307 is satisfied, the item is displayed at a position that does not overlap a range indicated by the line-of-sight pointer and is within a predetermined range from the range indicated by the line-of-sight pointer. The range indicated by the line-of-sight pointer is, for example, a region including the line-of-sight pointer such as a region of the line-of-sight pointer or a rectangular region circumscribing the line-of-sight pointer.

In S314, the system control unit 50 displays the item below (directly below) the line-of-sight pointer (the line-of-sight position). In S315, the system control unit 50 displays the item above (directly above) the line-of-sight pointer. In S316, the system control unit 50 displays the item on the upper right of the line-of-sight pointer. In S317, the system control unit 50 displays the item on the lower right of the line-of-sight pointer. In S318, the system control unit 50 displays the item on the upper left of the line-of-sight pointer. In S319, the system control unit 50 displays the item on the lower left of the line-of-sight pointer.

In S320, the system control unit 50 fixes the display position of the item indicating an error, a setting value, or the like not to follow the line-of-sight position detected by the line-of-sight detection circuit 165. In this way, after the item is displayed near the line-of-sight position in response to the predetermined condition in S307 being satisfied, the display position of the item will not be changed unless the predetermined condition is satisfied again. In a case where the line-of-sight pointer is moved to the display position of the item, the line-of-sight pointer may be displayed to be superimposed on the item, or the item may be displayed to be superimposed on the line-of-sight pointer.

In S321, the system control unit 50 hides the item after a predetermined period of time (for example, 1 second, 3 seconds, 5 seconds, or the like) has elapsed since the item indicating an error or a setting value was displayed. For example, the item is hidden after a predetermined period of time has elapsed since the display of the item started.

In S322, the system control unit 50 determines whether or not a predetermined condition such as the occurrence of an error and the change of a setting value is satisfied again in the digital camera 100. In a case where the predetermined condition is satisfied, the process proceeds to S308, and otherwise, the process proceeds to S323.

In S323, the system control unit 50 determines whether or not the shutter button 61 is fully pressed to perform a photographing instruction (whether or not the second shutter switch 64 is turned on to output the signal SW2). In a case where the photographing instruction is performed, the process proceeds to S324, and otherwise, the process proceeds to S325.

In S324, the system control unit 50 performs a series of pieces of photographing processing from exposure in the imaging unit 22 to recording the captured still image on the recording medium 200 as an image file. Video recording is started as photographing start processing of the still image. The item may be hidden in response to photographing the still image (the photographing processing).

In S325, the system control unit 50 determines whether or not another operation is performed on the operation unit 70. In a case where the other operation is performed, the process proceeds to S326, and otherwise, the process proceeds to S327. The other operation includes, for example, an operation temporarily hiding the LV image such as pressing the menu button 81.

In S326, the system control unit 50 performs processing (another processing) according to the operation in S325.

In S327, the system control unit 50 determines whether or not there is an end event of the photographing mode (an instruction to transition to another operation mode such as a power-off operation or a reproduction mode). In a case where there is no end event, the process proceeds to S302, and in a case where there is an end event, the photographing mode processing ends.

Modification Example

Figure 4A:
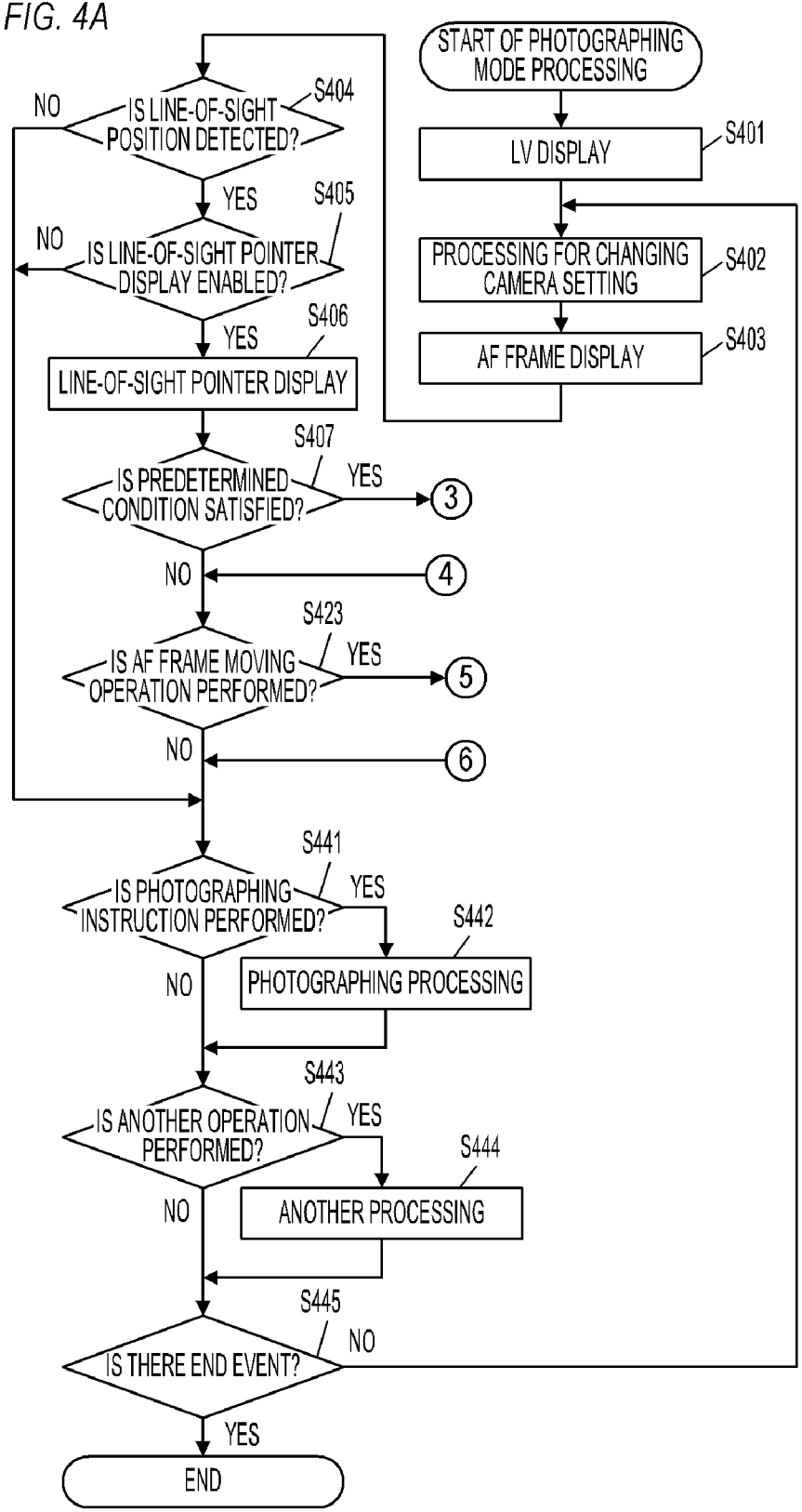
FIGS. 4A to 4C are flowcharts of a modification example of the photographing mode processing.
Figure 4B:
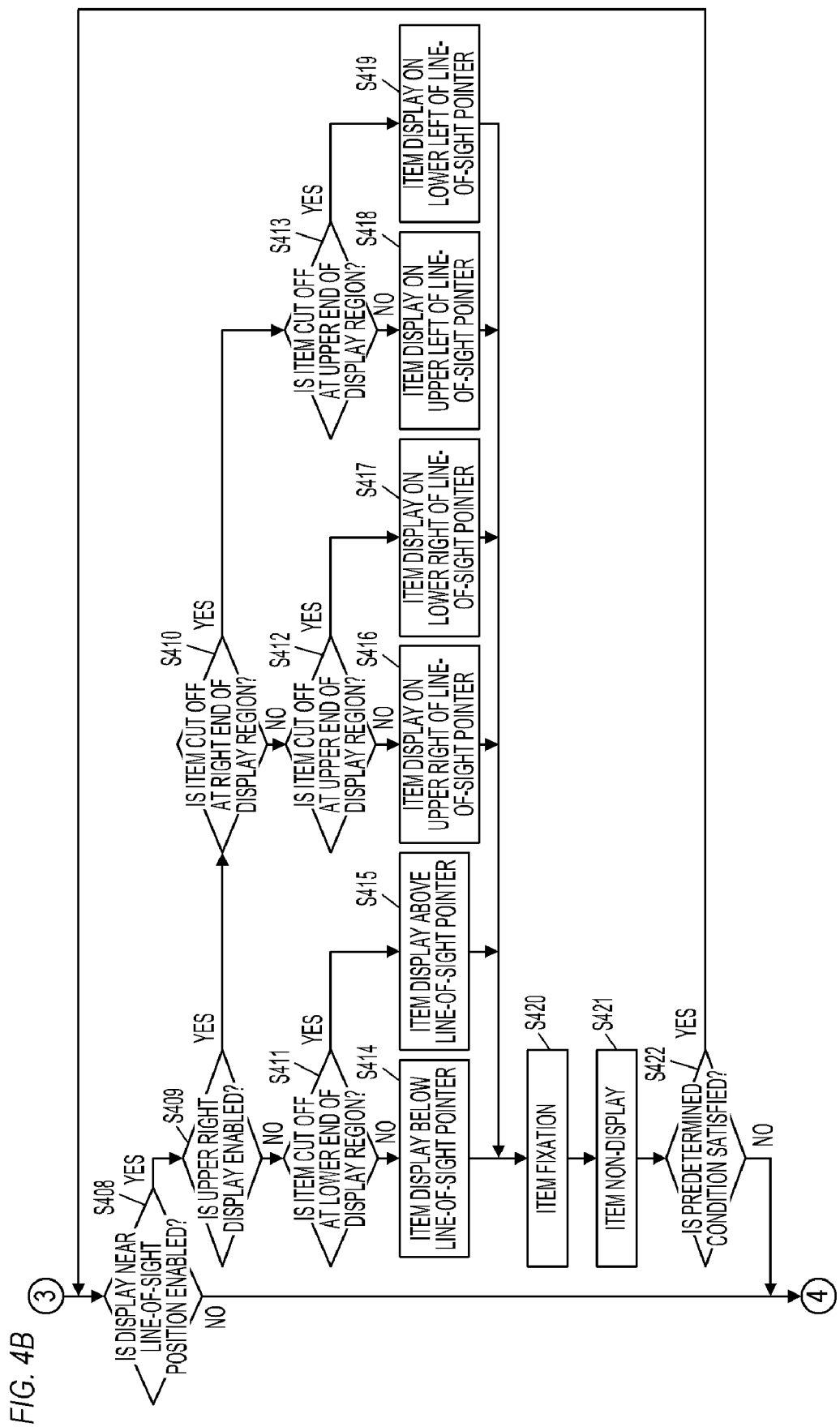
Figure 4C:
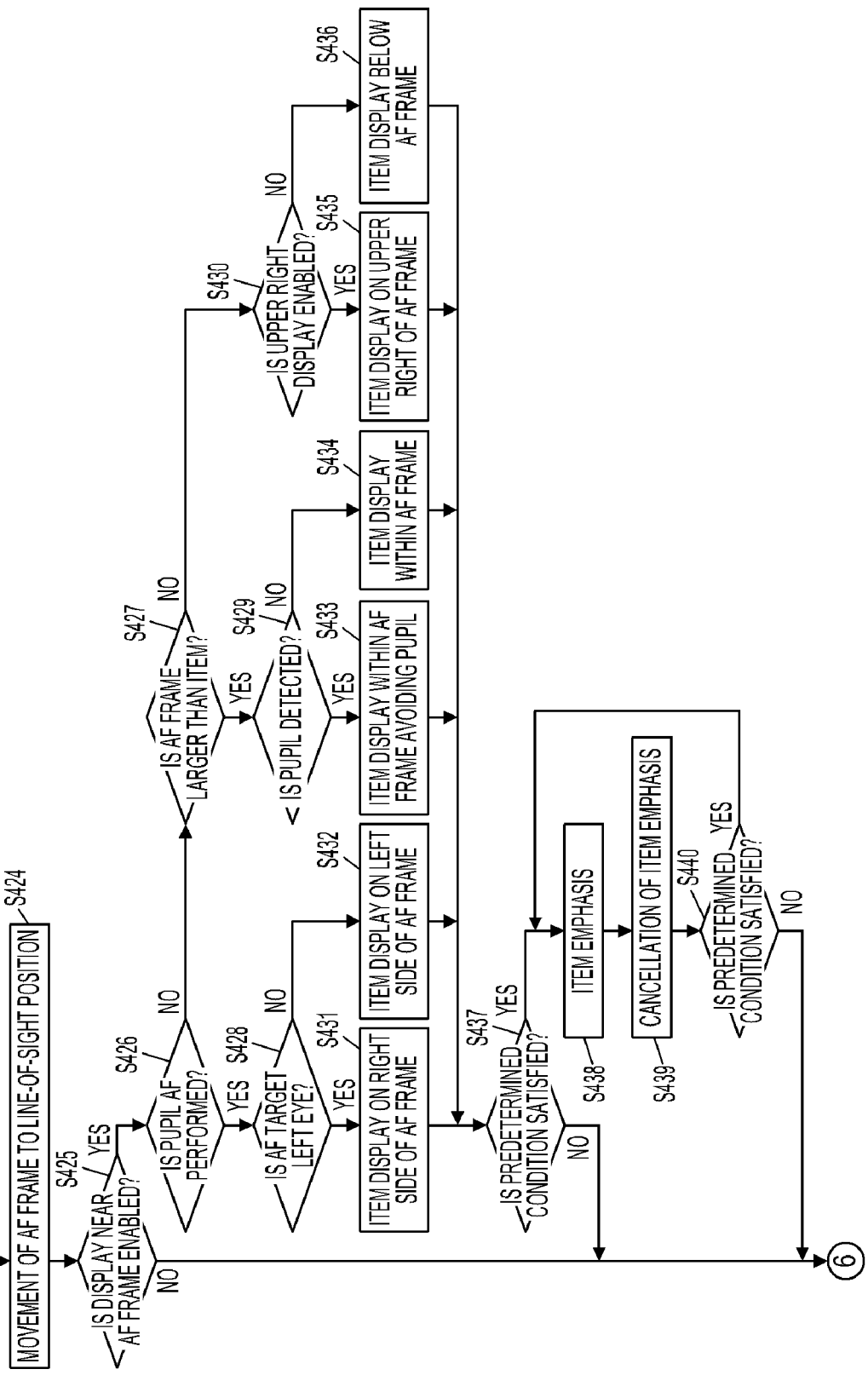

FIGS. 4A to 4C are flowcharts of photographing mode processing in the digital camera 100. This processing is realized by the system control unit 50 developing the program stored in the non-volatile memory 56 into the system memory 52 and executing the program. When the digital camera 100 is activated in the photographing mode, flags, control variables, and the like are initialized, and the processing of FIGS. 4A to 4C is started. The processing of S401 to S422 is the same as the processing of S301 to S322 in FIGS. 3A and 3B, and the processing of S441 to S445 is the same as the processing of S323 to S327 in FIGS. 3A and 3B.

In S423, the system control unit 50 determines whether or not an AF frame moving operation to move the AF frame on the basis of the line-of-sight position is performed. This AF frame moving operation is, for example, half-pressing of the shutter button 61 (a photographing preparation instruction; an operation of turning on the first shutter switch 62). In a case where the AF frame moving operation is performed, the process proceeds to S424, and otherwise, the process proceeds to S441.

In S424, the system control unit 50 moves the AF frame on the basis of the line-of-sight position detected by the line-of-sight detection circuit 165 (a change of the display position of the AF frame). Without performing the processing of S403, in response to a first photographing preparation instruction, the AF frame may be displayed at a position based on the line-of-sight position such as the line-of-sight position detected by the line-of-sight detection circuit 165 or the position of the object closest to the line-of-sight position. Then, the AF frame may be moved to a position based on the line-of-sight position detected by the line-of-sight detection circuit 165 in response to second and subsequent photographing preparation instructions (AF frame moving operations). The AF frame may follow the AF target object in a case where the AF frame moving operation is not performed.

In S425, the system control unit 50 determines whether or not display near the AF frame (setting for displaying the item indicating a setting value or the like near the AF frame) is enabled. In a case where the display near the AF frame is enabled, the process proceeds to S426, and otherwise, the process proceeds to S441. For example, enabling/disabling of the display near the AF frame is also set by the user in the same way as enabling/disabling of the display near the line-of-sight position.

In S426, the system control unit 50 determines whether or not pupil AF is performed (whether or not the AF target object is the pupil). The pupil AF is AF that is performed on the eye (the pupil) which is a detected human organ. In a case where the pupil AF is performed, the process proceeds to S428, and otherwise, the process proceeds to S427.

In S427, the system control unit 50 determines whether or not the AF frame is larger than the item displayed near the AF frame. In a case where the AF frame is larger than the item, the process proceeds to S429, and otherwise, the process proceeds to S430. This determination may be determining whether or not the image size (the number of pixels) of the AF frame is a predetermined number of times (a predetermined amount) or more of the item, or determining whether or not the image size of the AF frame is larger than a threshold value (whether or not the number of pixels of the AF frame is greater than a threshold value).

In S428, the system control unit 50 determines whether or not the eye for which the AF is performed (the AF target object) is a left eye. In a case where the AF is performed for the left eye, the process proceeds to S431, and otherwise, the process proceeds to S432.

In S429, the system control unit 50 determines whether or not the pupil is detected within the AF frame. In a case where the pupil is detected within the AF frame, the process proceeds to S433, and otherwise, the process proceeds to S434.

In S430, the system control unit 50 determines whether or not upper right display (setting for displaying the item indicating a setting value or the like on the upper right of the AF frame) is enabled. In a case where the upper right display is enabled, the process proceeds to S435, and otherwise, the process proceeds to S436.

In S431 to S436, the system control unit 50 displays the item indicating a setting value or the like at a position based on the determination results of S425 to S430 in the display region of the EVF 29. The item is displayed at a position that does not overlap a range indicated by the AF frame and is within a predetermined range from the range indicated by the AF frame. The range indicated by the AF frame is, for example, a region including the AF frame such as a region of the AF frame or a rectangular region circumscribing the AF frame. In a case where the line-of-sight pointer is moved to the display position of the item, the line-of-sight pointer may be displayed to be superimposed on the item, or the item may be displayed to be superimposed on the line-of-sight pointer. After the item is displayed near the AF frame, the item is displayed on the basis of the display position of the AF frame regardless of the line-of-sight position.

In S431, the system control unit 50 displays the item on the right side of the AF frame (the left eye). In S432, the system control unit 50 displays the item on the left side of the AF frame (the right eye). In S433, the system control unit 50 displays the item within the AF frame avoiding a region (a position) of the detected pupil (eye). In S434, the system control unit 50 displays the item at a predetermined position (the upper right or the bottom) within the AF frame. In S435, the system control unit 50 displays the item on the upper right of the AF frame. In S436, the system control unit 50 displays the item below (directly below) the AF frame. As the processing of S430, S435, and S436, the processing of replacing the "line-of-sight pointer" in the processing of S409 to S419 with the "AF frame" may be performed.

In S437, the system control unit 50 determines whether or not a predetermined condition such as the change of a setting value is satisfied in the digital camera 100. In a case where the predetermined condition is satisfied, the process proceeds to S438, and otherwise, the process proceeds to S441.

In S438, the system control unit 50 emphasizes the item indicating a setting value or the like. For example, the system control unit 50 displays the item indicating a setting value. Then, in response to the operation of changing the setting value being performed on the operation unit 70, the system control unit 50 updates the item to indicate the changed setting value and emphasizes the item. Emphasizing the item is, for example, processing of reducing transparency, blinking, or displaying an outline to increase visibility and saliency.

In S439, the system control unit 50 cancels the emphasizing of the item after a predetermined period of time (for example, 1 second, 3 seconds, 5 seconds, or the like) has elapsed since the item indicating a setting value or the like was emphasized. For example, the emphasizing of the item is canceled after a predetermined period of time has elapsed since the emphasis display of the item started.

In S440, the system control unit 50 determines whether or not a predetermined condition such as the change of a setting value is satisfied again in the digital camera 100. In a case where the predetermined condition is satisfied, the process proceeds to S438, and otherwise, the process proceeds to S441.

FIGS. 6A to 6H show examples of screens displayed on the EVF 29 in still image photographing mode.

Figure 6A:
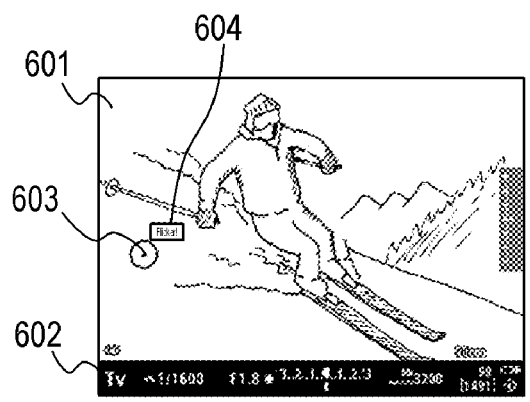
FIGS. 6A to 6I are diagrams showing screen examples.

In FIG. 6A, an LV image 601 and information 602 regarding the still image photographing are displayed. Further, a line-of-sight pointer 603 is displayed to be superimposed on the LV image 601. Then, in response to the detection of the flicker, an item 604 indicating that the flicker is occurring is displayed on the upper right of the line-of-sight pointer 603. When the item 604 is displayed near the line-of-sight pointer 603, the user can check the item 604 with a small amount of movement of the line of sight. Further, since the line-of-sight pointer 603 and the item 604 are not superimposed on each other (the object that the user is looking at is not hidden by the item 604), the item 604 does not disturb the user. FIG. 6A corresponds to the state after the processing of S316 of FIG. 3B or S416 of FIG. 4B.

Figure 6B:
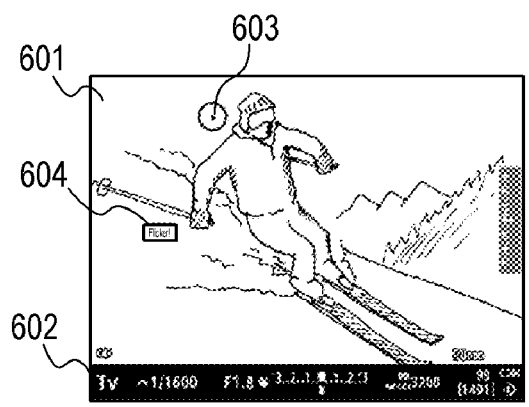

When the user moves his eye from the state of FIG. 6A, the state transitions to a state of FIG. 6B. In FIG. 6B, the display position of the line-of-sight pointer 603 is changed from that in FIG. 6A, but the display position of the item 604 is fixed (S320 in FIG. 3B and S420 in FIG. 4B) and is the same as that in FIG. 6A. When the item 604 is displayed near the line-of-sight pointer 603 (the line-of-sight position of the user), the line of sight of the user tends to turn toward the item 604. Since the line-of-sight pointer 603 does not move, it is possible to prevent the item 604 from being continuously displayed near the line-of-sight pointer 603 and to prevent the line of sight from turning toward the item 604 against the intention of the user.

Figure 6C:
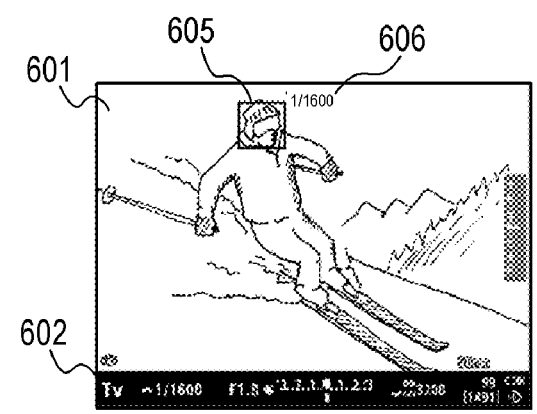

FIG. 6C corresponds to the state after the photographing preparation instruction (the AF frame moving operation) is performed. In FIG. 6C, the LV image 601 and the information 602 are displayed as in FIG. 6A and the like. In FIG. 6C, unlike in FIG. 6A and the like, an AF frame 605 is displayed to be superimposed on the LV image 601. An item 606 indicating a setting value is displayed on the upper right of the AF frame 605. When the item 606 is displayed near the AF frame 605, the user can check the item 606 with a small amount of movement of the line of sight in a case where the user is looking at the AF target object (the object indicated by the AF frame 605). Further, since the AF frame 605 and the item 606 are not superimposed on each other (the object indicated by the AF frame 605 is not hidden by the item 606), the item 606 does not disturb the user. FIG. 6C corresponds to the state after the processing of S435 of FIG. 4C. In FIG. 6C, the line-of-sight pointer 603 is not displayed, but may be displayed.

Figure 6D:
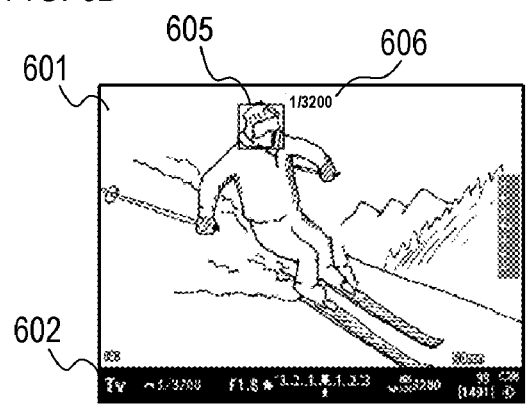

When an operation to change the setting value is performed in the state of FIG. 6C, the state transitions to a state of FIG. 6D. In FIG. 6D, the setting value indicated by the item 606 is the changed value (similarly, the information 602 has been updated). Further, the item 606 is emphasized. In this way, the user can immediately notice that the setting value is changed and can immediately check the changed setting value (with a small amount of movement of the line of sight). FIG. 6D corresponds to the state after the processing of S438 of FIG. 4C.

Figure 6E:
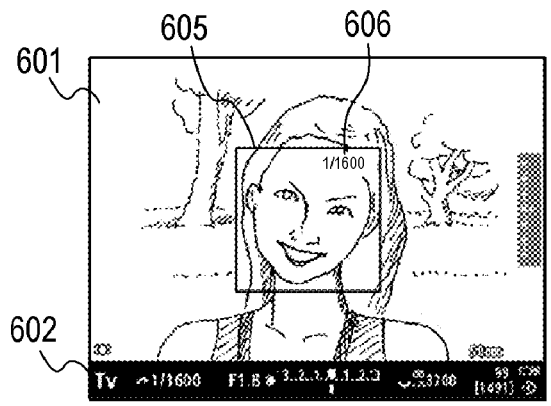

In FIG. 6E, the LV image 601, the information 602, the AF frame 605, and the item 606 are displayed as in FIG. 6C and the like. In FIG. 6E, the AF frame 605 is larger than that in FIG. 6C, and the item 606 is displayed within the AF frame 605. The user often looks at the vicinity of the center of the AF frame 605 when looking at the AF target object. Therefore, in a case where the AF frame 605 is large, the user needs to move his/her eye largely to see the outside of the AF frame 605. When the item 606 is displayed within the AF frame 605, the user can check the item 606 with a small amount of movement of the line of sight. Since the AF frame 605 is large, even if the item 606 is displayed within the AF frame 605, the item 606 does not disturb the user. In a case where the pupil is detected within the AF frame 605, the item 606 is displayed not to overlap the pupil. FIG. 6E corresponds to the state after the processing of S433 or S434 of FIG. 4C.

Figure 6F:
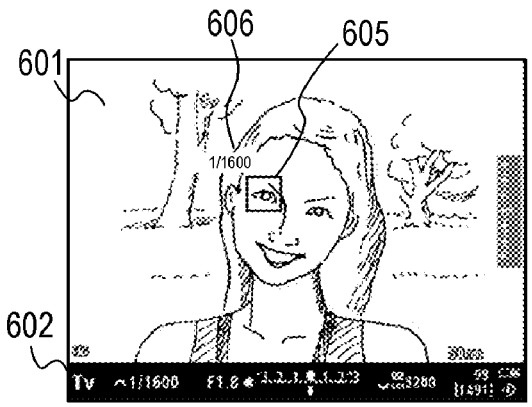

In FIG. 6F, the LV image 601, the information 602, the AF frame 605, and the item 606 are displayed as in FIG. 6C and the like. In FIG. 6F, the object indicated by the AF frame 605 is the right eye, and the item 606 is displayed on the left side (the upper left) of the AF frame 605. In this way, the item 606 can be displayed not to overlap not only the right eye of the AF target object but also the left eye. FIG. 6F corresponds to the state after the processing of S432 of FIG. 4C.

Figure 6G:
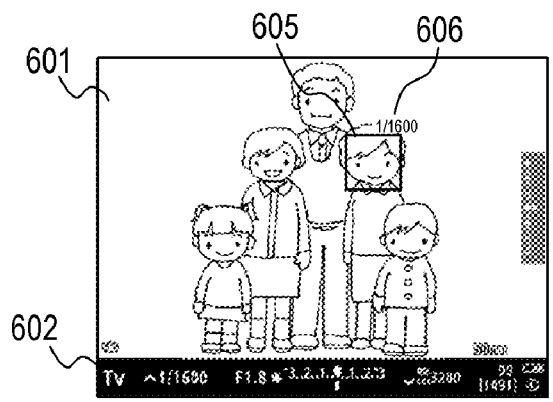
Figure 6H:
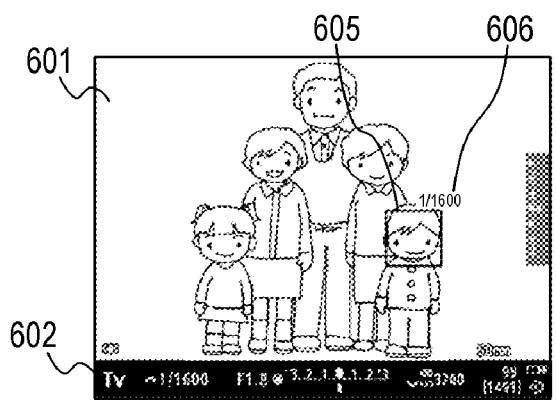

In FIG. 6G, the LV image 601, the information 602, the AF frame 605, and the item 606 are displayed as in FIG. 6C and the like. In FIG. 6G, a plurality of objects are detected. In a state of FIG. 6G, when the AF target object is changed with the operation of the 4-direction key 74 or the like, the state transitions to a state of FIG. 6H. Since the item 606 also moves as the AF frame 605 moves, the user can check the item 606 with a small amount of movement of the line of sight even after the AF frame 605 moves. Further, as in FIG. 6C and the like, the item 606 does not disturb the user. FIG. 6G or 6H corresponds to the state after the processing of S435 or the like of FIG. 4C.

As described above, according to the present embodiment, an item is displayed near an indicator (such as the line-of-sight pointer or the AF frame) that the user is likely to pay attention to so as not to overlap the indicator. In this way, it is possible to check the item with a small amount of movement of the line of sight, and it is possible to prevent the item from disturbing the user.

The various controls described above that are performed by the system control unit 50 may be performed by one piece of hardware, or a plurality of pieces of hardware (for example, a plurality of processors or circuits) may share the processing to perform the control of the entire apparatus.

Further, although the embodiments of the present invention have been described in detail, the present invention is not limited to these specific embodiments, and various forms without departing the scope of the present invention are also included in the present invention. Furthermore, each embodiment described above merely shows one embodiment of the present invention, and it is also possible to combine the embodiments as appropriate. For example, the specific operation for displaying (moving) the AF frame on the basis of the line-of-sight position may not be the half-pressing of the shutter button 61.

Further, in the above-described embodiments, the case where the present invention is applied to an imaging apparatus (a digital camera) has been described as an example, but the present invention is not limited to this example and can be applied to any electronic apparatus capable of detecting a line of sight. For example, the present invention can be applied to personal computers, PDAs, mobile phone terminals, portable image viewers, printing apparatuses, digital photo frames, music players, game machines, electronic book readers, and the like. In addition, the present invention is can be applied to video players, display apparatuses (including projection apparatuses), tablet terminals, smartphones, AI speakers, home appliances, vehicle-mounted apparatuses, and the like.

Other Embodiments

Figure 5A:
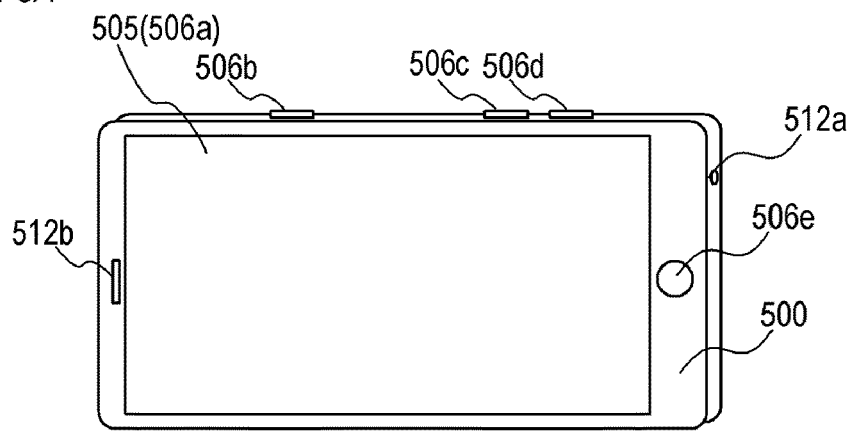
FIG. 5A is an external view of a display control apparatus.

FIG. 5A is an external view of a display control apparatus 500 as an example of an electronic apparatus to which the present invention can be applied. The display control apparatus 500 is, for example, a display apparatus such as a smartphone. A display 505 is a display unit that displays images and various types of information. The display 505 is configured integrally with a touch panel 506a and is made such that a touch operation on the display surface of the display 505 can be detected. The display control apparatus 500 is capable of VR-displaying a virtual reality (VR) image (a VR content) on the display 505. An operation unit 506b is a power button that receives an operation for switching the power of the display control apparatus 500 between on and off. An operation unit 506c and an operation unit 506d are volume buttons for increasing or decreasing the volume of an audio output from a speaker 512b, an earphone or an external speaker connected to an audio output terminal 512a, or the like. An operation unit 506e is a home button for displaying a home screen on the display 505. The audio output terminal 512a is an earphone jack and is a terminal for outputting an audio signal to an earphone, an external speaker, or the like. The speaker 512b is a built-in speaker for outputting sound.

Figure 5B:
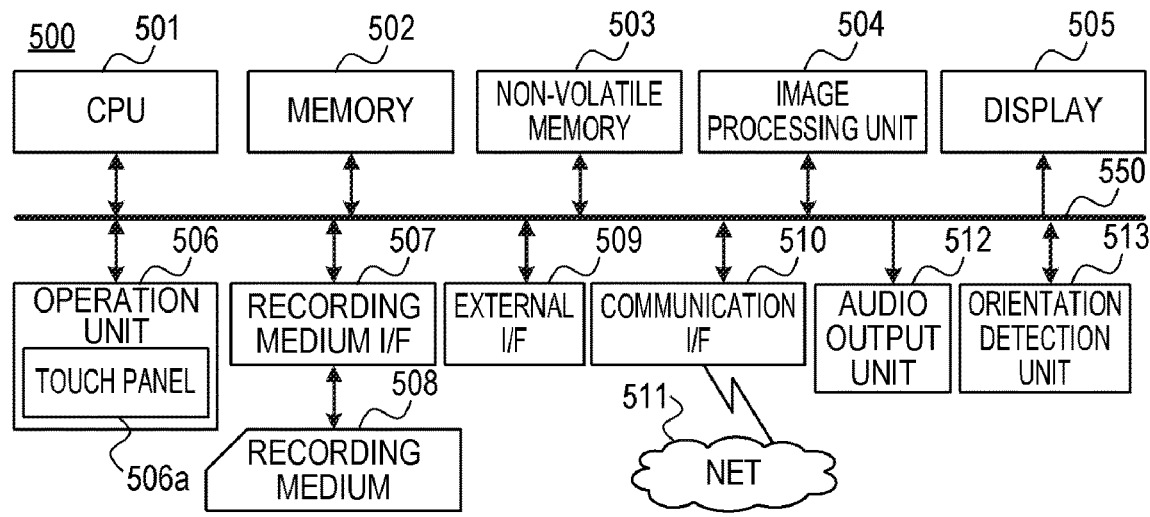
FIG. 5B is a block diagram of the display control apparatus.

FIG. 5B is a block diagram showing a configuration example of the display control apparatus 500. A CPU 501, a memory 502, a non-volatile memory 503, an image processing unit 504, a display 505, an operation unit 506, a recording medium I/F 507, an external I/F 509, and a communication I/F 510 are connected to an internal bus 550. Further, an audio output unit 512 and an orientation detection unit 513 are also connected to the internal bus 550. Each unit connected to the internal bus 550 is capable of exchanging data with each other via the internal bus 550.

The CPU 501 is a control unit that controls the entire display control apparatus 500 and is constituted by at least one processor or circuit. The memory 502 is, for example, a RAM (such as a volatile memory using a semiconductor element). The CPU 501 uses the memory 502 as a work memory to control each unit of the display control apparatus 500 according to the program stored in the non-volatile memory 503, for example. The non-volatile memory 503 stores image data, audio data, other data, various programs for the CPU 501 to operate, and the like. The non-volatile memory 503 is constituted by, for example, a flash memory or a ROM.

The image processing unit 504 executes various types of image processing with respect to an image stored in the non-volatile memory 503 or a recording medium 508, a video signal obtained via the external I/F 509, an image obtained via the communication I/F 510, or the like on the basis of the control of the CPU 501. The image processing performed by the image processing unit 504 includes A/D conversion processing, D/A conversion processing, image data encoding processing, image data compression processing, image data decoding processing, enlargement/reduction processing (resizing), noise reduction processing, color conversion processing, and the like. Further, various types of image processing such as panorama development, mapping processing, and conversion of the VR image that is an omnidirectional image or a wide-range image having a wide-range video even if it is not omnidirectional are also performed. The image processing unit 504 may be constituted by a dedicated circuit block for executing specific image processing. Further, depending on the type of image processing, the CPU 501 can execute image processing according to the program without using the image processing unit 504.

The display 505 displays an image, a GUI screen that forms a graphical user interface (GUI), and the like on the basis of the control of the CPU 501. The CPU 501 controls each unit of the display control apparatus 500 to generate a display control signal according to the program, to generate a video signal for display on the display 505, and to output the video signal to the display 505. The display 505 displays a video on the basis of the generated/output video signal. The display control apparatus 500 itself may include an interface for outputting the video signal for display on the display 505, and the display 505 may be configured by an external monitor (a television, an HMD, or the like).

The operation unit 506 is an input device for accepting user operations, including a character information input device such as a keyboard, a pointing device such as a mouse or a touch panel, a button, a dial, a joystick, a touch sensor, a touch pad, and the like. In the present embodiment, the operation unit 506 includes the touch panel 506a and the operation units 506b, 506c, 506d, and 506e.

The recording medium 508 such as a memory card, CD, or DVD can be detachably attached to the recording medium I/F 507. The recording medium I/F 507 reads data from the attached recording medium 508 and writes data to the recording medium 508 on the basis of the control of the CPU 501. The recording medium 508 stores data such as an image to be displayed on the display 505. The external I/F 509 is an interface that is connected to an external apparatus via a wired cable (such as a USB cable) or wirelessly for performing input/output (data communication) of the video signal and the audio signal. The communication I/F 510 is an interface that communicates (wirelessly communicates) with an external apparatus, the Internet 511, or the like for performing transmission/reception of various types of data such as files and commands (data communication).

The audio output unit 512 outputs an audio of a moving image or music data reproduced by the display control apparatus 500, operation sounds, ringtones, various notification sounds, and the like. The audio output unit 512 includes the audio output terminal 512a for connecting an earphone or the like and the speaker 512b, but the audio output unit 512 may output audio data to an external speaker through wireless communication or the like.

The orientation detection unit 513 detects the orientation (the inclination) of the display control apparatus 500 with respect to a direction of gravity and the orientation of the display control apparatus 500 with respect to each axis of a yaw direction, a pitch direction, and a roll direction, and notifies the CPU 501 of the orientation information. It is possible to determine whether the display control apparatus 500 is held horizontally, is held vertically, is directed upward, is directed downward, is in an oblique orientation, or the like on the basis of the orientation detected by the orientation detection unit 513. In addition, it is possible to determine whether or not the display control apparatus 500 is tilted in the rotation directions such as the yaw direction, the pitch direction, and the roll direction; the degree of the tilt; whether the display control apparatus 500 is rotated in the rotation direction; and the like. One sensor or a combination of a plurality of sensors among an acceleration sensor, a gyro sensor, a geomagnetic sensor, an orientation sensor, an altitude sensor, and the like can be used as the orientation detection unit 513.

As described above, the operation unit 506 includes the touch panel 506a. The touch panel 506a is an input device which is superimposed on the display 505 and configured in a plane and from which coordinate information is output according to the touched position. The CPU 501 can detect the following operations or states on the touch panel 506a.

A state in which the touch panel 506a is newly touched by a finger or pen that has not touched the touch panel 506a, that is, the start of touch (hereinafter referred to as touch-down).

A state in which the touch panel 506a is touched with a finger or a pen (hereinafter referred to as touch-on).

A state in which the finger or pen is moving while touching the touch panel 506a (hereinafter referred to as touch-move).

A state in which the finger or pen touching the touch panel 506a is separated from the touch panel 506a, that is, the end of touch (hereinafter referred to as touch-up).

A state in which nothing is touched on the touch panel 506a (hereinafter referred to as touch-off).

When the touch-down is detected, the touch-on is also detected at the same time. After the touch-down, the touch-on normally continues to be detected unless the touch-up is detected. Even in a case where the touch-move is detected, the touch-on is detected at the same time. Even if the touch-on is detected, the touch-move is not detected if the touch position does not move. When it is detected that all the finger and pen that have touched have touched up, the touch-off is detected.

The CPU 501 is notified of these operations/states and the coordinates of the position where the finger or pen touches the touch panel 506a through the internal bus, and then, the CPU 501 determines what kind of operation (touch operation) is performed on the touch panel 506a on the basis of the notified information. As for the touch-move, the moving direction of the finger or pen moving on the touch panel 506a can also be determined for each vertical component/horizontal component on the touch panel 506a on the basis of the change in the position coordinates. In a case where it is detected that the touch-move has been performed for a predetermined distance or more, it is determined that a slide operation is performed. An operation of touching the touch panel 506a with the finger and quickly moving it by a certain distance and then releasing it as it is, is called a flick. The flick is, in other words, an operation of quickly tracing the touch panel 506a as if the finger flicks on the touch panel 506a. It can be determined that the flick is performed when the touch-move of a predetermined distance or more at a predetermined speed or more is detected and the touch-up is detected as it is (it can be determined that the flick occurs following the slide operation). Further, a touch operation of touching a plurality of locations (for example, two points) at the same time to bring the touch positions closer to each other is referred to as pinch-in, and a touch operation of moving the touch positions away from each other is referred to as pinch-out. The pinch-out and the pinch-in are collectively referred to as a pinch operation (or simply pinch). As the touch panel 506a, any one of various types of touch panels such as a resistive film type, a capacitive type, a surface acoustic wave type, an infrared type, an electromagnetic induction type, an image recognition type, an optical sensor type, and the like may be used. There are a method of detecting that there is a touch when there is contact with the touch panel, and a method of detecting that there is a touch when there is an approach of the finger or pen to the touch panel, but any one method may be used.

Figure 5C:
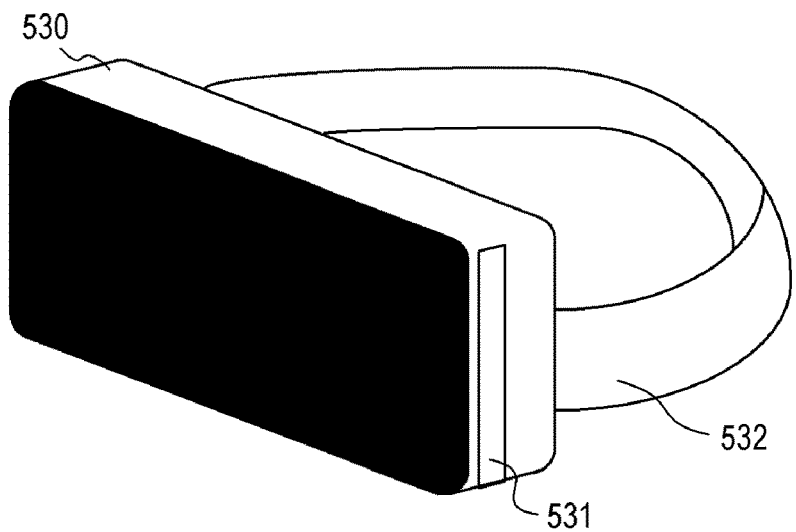
FIG. 5C is an external view of VR goggles.

FIG. 5C is an external view of VR goggles (a head mount adapter) 530 to which the display control apparatus 500 can be attached. The display control apparatus 500 can also be used as a head mounted display (HMD) by being attached to the VR goggles 530. An insertion slot 531 is an insertion slot for inserting the display control apparatus 500. The entire display control apparatus 500 can be inserted into the VR goggles 530 with the display surface of the display 505 facing a side (that is, the user side) of a headband 532 for fixing the VR goggles 530 to the user' head. The user can visually recognize the display 505 without holding the display control apparatus 500 by hand while wearing the VR goggles 530, to which the display control apparatus 500 is attached, on the user's head. In this case, when the user moves the head or the whole body, the orientation of the display control apparatus 500 also changes. The orientation detection unit 513 detects the orientation change of the display control apparatus 500 at this time, and the CPU 501 performs processing for VR display on the basis of this orientation change. In this case, detection of the orientation of the display control apparatus 500 by the orientation detection unit 513 is equivalent to detection of the orientation of the user's head (a direction in which the line of sight of the user is directed). The display control apparatus 500 itself may be an HMD that can be worn on the head without the VR goggles. The display control apparatus 500 may have a configuration (a line-of-sight detection unit) that detects the line of sight of the user in more detail.

In a case where the present invention is applied to the display control apparatus 500, the image displayed on the display 505 may not be an LV image. The image displayed on the display 505 may be a computer graphic (CG) image such as a game screen. An image of xR such as virtual reality (VR), augmented reality (AR), or mixed reality (MR) may be displayed on the display 505. In this case as well, an item is displayed near an indicator that the user is likely to pay attention to so as not to overlap the indicator. The indicator is, for example, an indicator that indicates a line-of-sight position or an indicator that indicates a CG object.

Figure 6I:
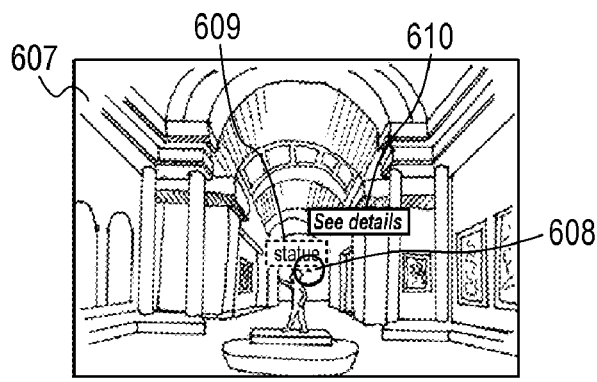

FIG. 6I is an example of a screen displayed on the display 505. In FIG. 6I, a VR image 607 is displayed, and an icon 608 indicating the line-of-sight position of the user is superimposed on the VR image 607. Further, in response to the user's gaze on an object (a bronze statue), simple information 609 on the object is displayed. An item 610 for displaying detailed information on the object that the user is gazing at is displayed near the simple information 609 not to overlap the simple information 609 in response to an operation on the operation unit 506. When the item 610 is displayed near the simple information 609 displayed in association with the object that the user is gazing at, the user can check the item 610 with a small amount of movement of the line of sight. Further, since the simple information 609 and the item 610 are not superimposed on each other, the user can check the simple information 609 without being disturbed by the item 610. In this way, the forms of the simple information 609 and the items 610 are not particularly limited, and they may not be rectangular.

The various controls described above that are performed by the CPU 501 may be performed by one piece of hardware, or a plurality of pieces of hardware (for example, a plurality of processors or circuits) may share the processing to perform the control of the entire apparatus.

According to the present invention, it is possible to display an item such that the user can check the item without being disturbed and with a small amount of movement of the line of sight.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-070192, filed on Apr. 21, 2022, which is hereby incorporated by reference herein in its entirety.

What is claimed is:

1. An electronic apparatus comprising at least one memory and at least one processor which function as:
   a detection unit configured to detect a line-of-sight position of a user within a display region; and
   a display control unit configured to control such that a first indicator is displayed on a basis of the line-of-sight position detected by the detection unit and an item is displayed at a position that does not overlap a range indicated by the first indicator when a predetermined condition is satisfied and is within a predetermined range from the range in response to the predetermined condition being satisfied,
   wherein the predetermined condition is occurrence of an error or a change in a setting value, and
   wherein the item indicates the error or the setting value.

2. The electronic apparatus according to claim 1, wherein the first indicator is a line-of-sight pointer that indicates the line-of-sight position detected by the detection unit.

3. The electronic apparatus according to claim 1, wherein, after the display control unit controls such that the item is displayed at a position that does not overlap a range indicated by the first indicator when the predetermined condition is satisfied and is within the predetermined range from the range, the display control unit does not change a display position of the item unless the predetermined condition is satisfied.

4. The electronic apparatus according to claim 1, wherein the display control unit controls such that the first indicator is displayed to overlap the item in a case of controlling such that the first indicator is displayed at a display position of the item.

5. The electronic apparatus according to claim 1, wherein the display control unit controls such that the item is hidden after a predetermined time has elapsed since the item was displayed.

6. The electronic apparatus according to claim 1, wherein the display control unit controls such that the first indicator indicating an object and a second indicator indicating the line-of-sight position are displayed on a basis of the line-of-sight position detected by the detection unit.

7. The electronic apparatus according to claim 1, wherein the item indicates a setting value.

8. The electronic apparatus according to claim 1, wherein the display control unit controls such that the first indicator is displayed in response to a specific operation.

9. The electronic apparatus according to claim 1,
wherein the user is capable of visually recognizing an imaging range of an imaging apparatus through the display region, and
wherein the first indicator indicates an object region of the imaging apparatus in the imaging range.

10. The electronic apparatus according to claim 1,
wherein the user is capable of visually recognizing an imaging range of an imaging apparatus through the display region, and
wherein the display control unit controls such that the first indicator is displayed in response to a half-press of a shutter button of the imaging apparatus.

11. The electronic apparatus according to claim 1, wherein the first indicator indicates a graphic displayed in the display region.

12. The electronic apparatus according to claim 1, wherein, after the display control unit controls such that the item is displayed at a position that does not overlap a range indicated by the first indicator and is within the predetermined range from the range, the display control unit controls such that the item is displayed on a basis of a display position of the first indicator regardless of the line-of-sight position.

13. The electronic apparatus according to claim 1, wherein the display control unit controls such that the item is emphasized in response to the predetermined condition being satisfied.

14. The electronic apparatus according to claim 13,
wherein the predetermined condition is a change in a setting value, and
wherein the item indicates the setting value.

15. The electronic apparatus according to claim 13, wherein the display control unit controls such that the emphasizing of the item is canceled after a predetermined time has elapsed since the item was emphasized.

16. A control method of an electronic apparatus, comprising:
detecting a line-of-sight position of a user within a display region; and
controlling such that a first indicator is displayed on a basis of the detected line-of-sight position and an item is displayed at a position that does not overlap a range indicated by the first indicator when a predetermined condition is satisfied and is within a predetermined range from the range in response to the predetermined condition being satisfied,
wherein the predetermined condition is occurrence of an error or a change in a setting value, and
wherein the item indicates the error or the setting value.

17. A non-transitory computer readable medium that stores a program, wherein the program causes a computer to execute a control method of an electronic apparatus, comprising:
detecting a line-of-sight position of a user within a display region; and
controlling such that a first indicator is displayed on a basis of the detected line-of-sight position and an item is displayed at a position that does not overlap a range indicated by the first indicator when a predetermined condition is satisfied and is within a predetermined range from the range in response to the predetermined condition being satisfied,
wherein the predetermined condition is occurrence of an error or a change in a setting value, and
wherein the item indicates the error or the setting value.

* * * * *